C. A. WILLAT & W. B. WESCOTT.
APPARATUS FOR THE PRODUCTION OF MOTION PICTURES AND THE LIKE.
APPLICATION FILED FEB. 24, 1917.
1,289,027.
Patented Dec. 24, 1918.
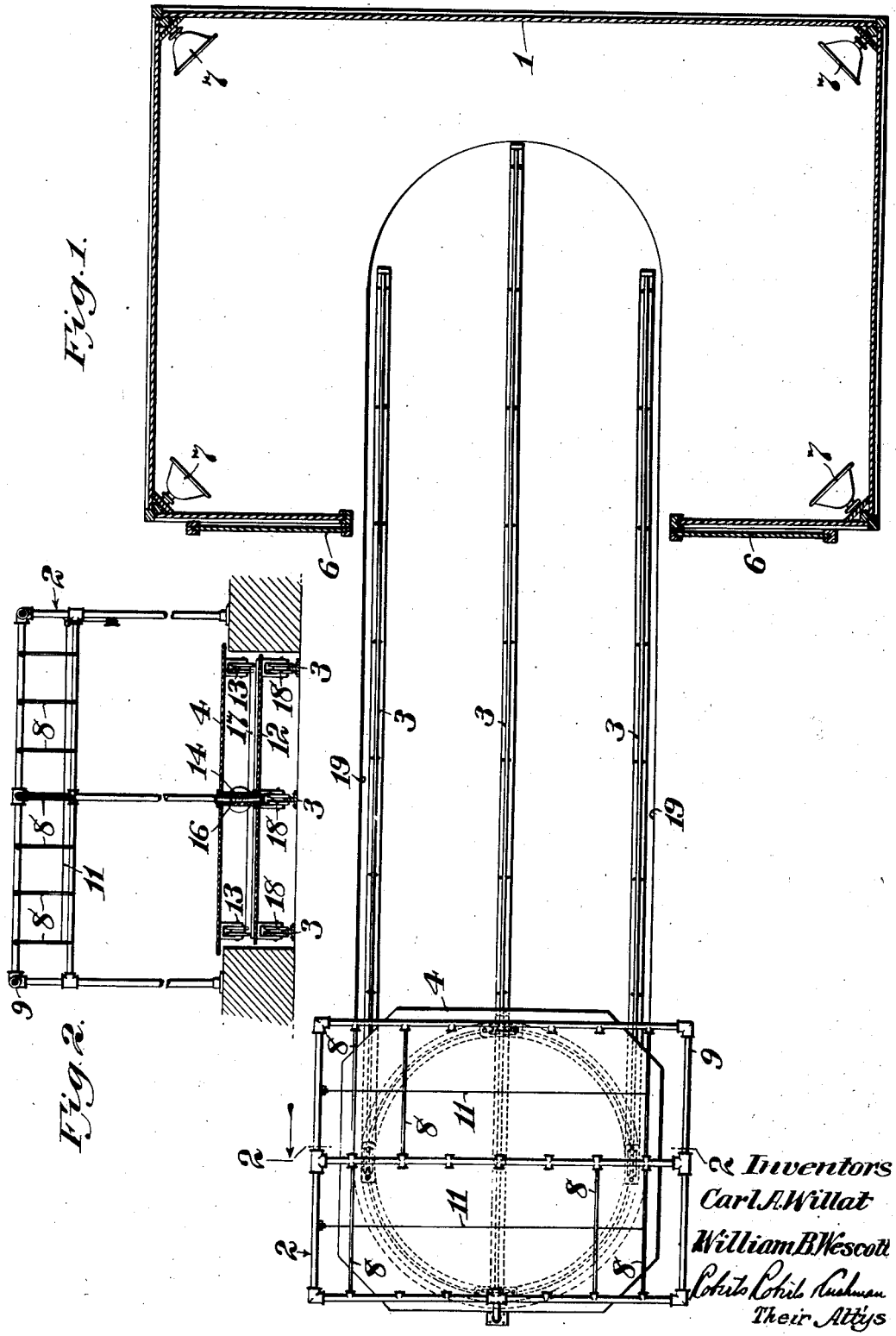

UNITED STATES PATENT OFFICE.

CARL A. WILLAT, OF BOSTON, AND WILLIAM B. WESCOTT, OF WELLESLEY HILLS, MASSACHUSETTS, ASSIGNORS TO KALMUS, COMSTOCK & WESCOTT, INCORPORATED, OF BOSTON, MASSACHUSETTS, A CORPORATION OF MASSACHUSETTS.

APPARATUS FOR THE PRODUCTION OF MOTION PICTURES AND THE LIKE.

1,289,027.     Specification of Letters Patent.     Patented Dec. 24, 1918.

Application filed February 24, 1917. Serial No. 150,814.

*To all whom it may concern:*

Be it known that we, CARL L. WILLAT and WILLIAM B. WESCOTT, citizens of the United States, and residents, respectively, of Boston, in the county of Suffolk and State of Massachusetts, and of Wellesley Hills, in the county of Norfolk and State of Massachusetts, have invented new and useful Improvements in Apparatus for the Production of Motion Pictures and the like, of which the following is a specification.

This invention relates particularly to a system for taking motion pictures either by natural or artificial light and for readily shifting the position of the object field between two regions of the system, the two regions being respectively arranged to be illuminated by natural and artificial light.

For many purposes it is highly desirable, in producing motion pictures, to make the original exposures outdoors where natural light may be employed. However, in most localities the production of pictures outdoors is continually being interrupted by unfavorable weather conditions, and heretofore this has been the cause of untold annoyance and expense. For example, suppose an object field comprising a large number of scenic objects has been carefully arranged and before the desired series of exposures have been made rain begins to fall. Not only are the actors and operators compelled to seek shelter but in many instances the scenic object must be hastily transported piece by piece to a place of shelter. Thus, the series of exposures is interrupted and the object field is either wholly or in part disarranged. In order to proceed with the pictures the field must either be reconstructed in a nearby studio or more favorable weather conditions must be awaited, either alternative involving considerable trouble and loss of time.

The principal object of applicants' invention is to provide means for illuminating an object field either with natural or artificial light and for quickly changing from one to the other form of illumination without disarranging the object field. A further object of the invention is to provide means for artificially lighting an object field in combination with means for relatively moving the object field and lighting means so that the artificial lighting may be replaced with natural illumination. A still further object of the invention is to provide means for illuminating one region with natural light and means for illuminating another region with artificial light, together with means for readily moving an object field from one region to the other region without disarranging the object field and, if desired, without even requiring the actors to leave the object field.

Other objects of the invention are to provide means for angularly shifting an object field with relation to a source of light, so that the light may be caused to strike the object field at the desired angle, and, when employing a source of light moving relatively to the object field, such as the sun, so that the object field may be maintained in approximately the same relative position with respect to the sun; to provide, in combination with light-diffusing means, means for angularly shifting an object field with respect to a light-diffusing means; and to provide means both for rotating and for transporting a stage.

One embodiment of our invention is shown by way of illustration in the accompanying drawings, in which—

Figure 1 is a plan view, largely diagrammatic, of a complete system; and

Fig. 2 is an elevation of the stage and light diffusing means.

The particular embodiment of our invention illustrated in the drawings comprises, in its entirety, a housing 1, light-diffusing means 2, a track system 3 extending between the housing 1 and the light-diffusing means 2, and a stage 4 mounted on the track system 3 so that it may readily be moved from beneath the light-diffusing means to the housing at the other end of the track system, and vice versa.

The housing 1 comprises a building adapted to inclose a stage of suitable proportions in such manner as to protect an object field arranged thereon from the effects of unfavorable weather conditions. At one side the housing is preferably provided with sliding doors to close the doorway required for the passage of the stage and objects thereon. The housing is also preferably provided with means for illuminating the stage and such means may be of any type suitable for the purpose, as for example, arc or mercury vapor lamps 7 or a relatively transparent covering for the housing adapted to transmit daylight to the stage.

The light-diffusing apparatus 2 which is more fully disclosed and is claimed in the application of Carl A. Willat, Sr. No. 149,140, filed February 16, 1917, comprises light-diffusing members 8 vertically disposed in spaced and approximately parallel relationship above the region which it is desired to illuminate. The light-diffusing members 8 are pivotally mounted in the frame work 9 and by means of cables 11 the diffusing members may together be swung to suitable angles with the vertical. As described in the said copending application the light-diffusing members may either be relatively transparent or largely reflective. In either event they are adapted to be disposed obliquely to the general course of direct sunlight and to diffuse all direct sunlight directed toward the object field, while at the same time permitting the passage of a large amount of diffused skylight unobstructedly between the spaced members. The diffusing apparatus may rest upon the surface of the ground, as illustrated, so that it may be angularly shifted as the sun shifts, or the same result may be accomplished by mounting it on the rotatable stage. In Fig. 1 some of the diffusing members 8 are omitted for the sake of clearness.

The stage 4 is rotatably mounted upon a supporting structure 12 by means of rollers or wheels 13 and a pivotal bearing 14. The bearing 14 comprises a vertical shaft 16 mounted at the center of the supporting structure 12, the shaft 16 being surrounded by a tubular shaft mounted at the center of the stage 4. The rollers 13 are mounted on the under side of the stage near the outer edge and in tangential relationship to the bearing 14, and the rollers may rest on a circular track 17 disposed upon the upper side of the support 12 concentrically with the bearing 14.

The supporting structure 12 is movably mounted on the track system 3 by means of wheels 18 so that the stage may not only be rotated but it may also be transported along the track system. The tracks 3 are preferably placed below the surface of the ground in a channel 19 of such depth that the stage, if round, is flush with the surface of the ground outside the housing and flush with the floor inside the housing and, if rectangular as illustrated, of such depth that the stage extends horizontally slightly above the surface of the ground and floor, respectively.

In fair weather the stage may be moved out beneath the light-diffusing apparatus 9 and set for the production of motion pictures, for example, by daylight, the light-diffusing apparatus being employed for the purpose of distributively illuminating the object field arranged upon the stage, and by rotating the stage light may be directed to the object field at the desired angle. Should a change in the weather, such as the approach of a shower, make it impossible to continue the production out-doors, and perhaps make it imperative to protect the scenic objects on the stage from the effects of the weather, the stage may quickly and easily be moved into the housing where the production of the pictures may be continued, if desired, with artificial light without appreciable loss of time. Or, in the event of a temporary shower, the stage may be housed during the shower and then run out again in undamaged and undisturbed condition, thus eliminating the great waste of time and energy heretofore involved in disarranging the object field and later rearranging it.

It is to be understood that the above is only one of the uses for which our invention is adapted, given for the purpose of illustration. Another highly useful purpose for which the system may be employed is the production of a motion picture photoplay where the scenes shift from indoors to outdoors; with a system such as herein disclosed the alternate indoor and outdoor scenes may be photographed with greater facility and, if desired, in consecutive order, that is, alternating between indoor and outdoor scenes.

While we have employed, for the purpose of illustration, an embodiment of our invention in which the stage is the particular part of the system including the housing, etc., which is bodily movable, it is to be understood that certain objects of the invention are attained by the relative movement of the stage and housing, and do not, therefore, require that the stage be the physically movable part of the system.

Moreover, it is not essential that the means for rotating the stage be movable along with the stage. On the contrary, a turn-table may be provided at each end of the track system, under the light diffusing apparatus and within the housing respectively, whereby the stage may be run upon either turn-table and then be revolved. With such an arrangement the turn-tables would be so arranged with respect to the track system that the portions of the track system on the turn-tables could be alined with the portion of the track system extending therebetween; and the stage would be mounted directly on the track system, by rollers or other suitable means, instead of being rotatably mounted upon a supporting structure as shown in the drawings.

What we claim is:—

1. In apparatus for the production of motion pictures and the like, the combination of a stage, a housing for at least partially inclosing the stage, the housing having means for illuminating the stage, and means for relatively shifting the housing and stage so that the stage may be illuminated by sunlight independently of the housing.

2. In apparatus for the production of motion pictures and the like, the combination of a stage, a housing for at least partially inclosing the stage, means in the housing for illuminating the stage so that photographic exposures of any object field arranged on the stage may be made, and means for moving the stage out of the housing so that photographic exposure of an object field comprising objects on the stage may be made outside of the housing.

3. In apparatus for the production of motion pictures and the like, the combination of a track system, a stage portably mounted thereon, a housing at least partially surrounding one end of the track system, and light diffusing means disposed above the other end of the track system, whereby the stage may be readily transported between the housing and the light-diffusing means.

Signed by us at Jacksonville, Florida, this thirty first day of January, 1917.

CARL A. WILLAT.
WILLIAM B. WESCOTT.

Witnesses:
JESSIE C. BROWN,
J. J. MURRAY.